United States Patent
Conrad et al.

(10) Patent No.: US 7,588,616 B2
(45) Date of Patent: Sep. 15, 2009

(54) VACUUM CLEANER WITH A PLATE AND AN OPENABLE DIRT COLLECTION CHAMBER

(75) Inventors: Wayne E. Conrad, Hampton (CA); Dave Peterson, Hampton (CA)

(73) Assignee: GBD Corp., Nassau (BM)

( * ) Notice: Subject to any disclaimer, the term of this patent is extended or adjusted under 35 U.S.C. 154(b) by 0 days.

(21) Appl. No.: 12/248,954

(22) Filed: Oct. 10, 2008

(65) Prior Publication Data

US 2009/0025176 A1    Jan. 29, 2009

Related U.S. Application Data

(63) Continuation of application No. 11/019,684, filed on Dec. 23, 2004, now Pat. No. 7,449,040, which is a continuation of application No. 10/030,108, filed as application No. PCT/CA00/00873 on Jul. 26, 2000, now Pat. No. 6,874,197, which is a continuation of application No. 09/482,649, filed on Jan. 13, 2000, now Pat. No. 6,440,197, which is a continuation-in-part of application No. 09/361,128, filed on Jul. 27, 1999, now Pat. No. 6,228,260, and a continuation-in-part of application No. 09/361,124, filed on Jul. 27, 1999, now Pat. No. 6,221,134.

(51) Int. Cl.
*B01D 45/12* (2006.01)

(52) U.S. Cl. .......................... 55/426; 55/429; 55/459.1; 55/DIG. 3; 15/350; 15/353

(58) Field of Classification Search .................. 55/426, 55/429, 432, 433, 459.1, DIG. 3; 15/350, 15/353
See application file for complete search history.

(56) References Cited

U.S. PATENT DOCUMENTS

| 911,258 A | 2/1909 | Neumann |
| 1,600,762 A | 9/1926 | Hawley |
| 1,797,812 A | 3/1931 | Waring |
| 1,898,608 A | 2/1933 | Alexander |
| 1,937,765 A | 12/1933 | Leathers |
| 2,015,464 A | 9/1935 | Saint-Jacques |
| 2,152,114 A | 3/1939 | Van Tongeren |
| 2,542,634 A | 2/1951 | Davis et al. |
| 2,678,110 A | 5/1954 | Madsen |
| 2,731,102 A | 1/1956 | James |
| 2,811,219 A | 10/1957 | Wenzl |

(Continued)

FOREIGN PATENT DOCUMENTS

AU    112778    4/1940

(Continued)

*Primary Examiner*—Robert A Hopkins
(74) *Attorney, Agent, or Firm*—Bereskin & Parr LLP/ S.E.N.C.R.L., S.r.l.

(57) ABSTRACT

A vacuum cleaner comprises a cleaner head adapted for movement over a surface and having a dirty air inlet; a handle for moving the cleaner head over the surface; a cyclone chamber having a cyclonic flow region, a fluid inlet downstream from the dirty air inlet and a fluid outlet; a particle receiving chamber having a door and an outer wall; a plate positioned between the cyclone chamber and the particle receiving chamber; and, a motor for causing the air to flow through the vacuum cleaner from the dirty air inlet to a vacuum cleaner air outlet.

9 Claims, 15 Drawing Sheets

U.S. PATENT DOCUMENTS

| | | |
|---|---|---|
| 2,846,024 A | 8/1958 | Bremi |
| 2,913,111 A | 11/1959 | Rogers |
| 2,917,131 A | 12/1959 | Evans |
| 2,937,713 A | 5/1960 | Stephenson et al. |
| 2,942,691 A | 6/1960 | Dillon |
| 2,946,451 A | 7/1960 | Culleton |
| 2,952,330 A | 9/1960 | Winslow |
| 2,981,369 A | 4/1961 | Yellott et al. |
| 3,032,954 A | 5/1962 | Racklyeft |
| 3,130,157 A | 4/1964 | Kelsall et al. |
| 3,200,568 A | 8/1965 | McNeil |
| 3,204,772 A | 9/1965 | Ruxton |
| 3,217,469 A | 11/1965 | Eckert |
| 3,269,097 A | 8/1966 | German |
| 3,372,532 A | 3/1968 | Cambell |
| 3,426,513 A | 2/1969 | Bauer |
| 3,518,815 A | 7/1970 | McFarland et al. |
| 3,530,649 A | 9/1970 | Porch et al. |
| 3,561,824 A | 2/1971 | Homan |
| 3,675,401 A | 7/1972 | Cordes |
| 3,684,093 A | 8/1972 | Kono et al. |
| 3,822,533 A | 7/1974 | Oranje |
| 3,898,068 A | 8/1975 | McNeil |
| 3,933,450 A | 1/1976 | Percevaut |
| 3,988,132 A | 10/1976 | Oranje |
| 3,988,133 A | 10/1976 | Schady |
| 4,097,381 A | 6/1978 | Ritzler |
| 4,187,088 A | 2/1980 | Hodgson |
| 4,486,207 A | 12/1984 | Baillie |
| 5,129,125 A | 7/1992 | Gamou et al. |
| 6,406,505 B1 * | 6/2002 | Oh et al. .................. 55/337 |
| 6,625,845 B2 * | 9/2003 | Matsumotoi et al. .......... 15/353 |
| 7,341,611 B2 * | 3/2008 | Greene et al. ................. 55/337 |

FOREIGN PATENT DOCUMENTS

| | | |
|---|---|---|
| DE | 875134 | 4/1953 |
| DE | 4232382 C1 | 3/1994 |
| GB | 700791 | 12/1953 |
| GB | 2282979 A | 4/1995 |
| WO | 80/02561 | 11/1980 |
| WO | 94/00046 | 1/1994 |
| WO | 96/27446 | 9/1996 |
| WO | 98/09121 | 3/1998 |
| WO | 98/43721 | 10/1998 |
| WO | 00/04816 | 2/2000 |

* cited by examiner

VACUUM CLEANER WITH A PLATE AND AN OPENABLE DIRT COLLECTION CHAMBER

This application is a continuation of application Ser. No. 11/019,684 filed on Dec. 23, 2004, now U.S. Pat. No. 7,449,040, which is a continuation of application Ser. No. 10/030,108 filed on Jul. 18, 2002 now U.S. Pat. No. 6,874,197, which is a 371 of serial number PCT/CA00/00873 filed on Jul. 26, 2000 which is a continuation of U.S. patent application Ser. No. 09/482,649 filed on Jan. 13, 2000 now issued as patent number U.S. Pat. No. 6,440,197, which is a continuation in part of application Ser. No. 09/361,128 filed on Jul. 27, 1999 now issued as U.S. Pat. No. 6,228,260, and also application Ser. No. 09/361,124 filed on Jul. 27, 1999 now issued as U.S. Pat. No. 6,221,134.

FIELD OF THE INVENTION

The present invention relates generally to cyclonic separators. In one particular application, the invention relates to the cyclonic separation of particulate material from an air flow. In a preferred embodiment, the cyclonic separator is used in a vacuum cleaner to remove entrained particulate matter from an air stream.

BACKGROUND OF THE INVENTION

The use of a cyclone, or multiple cyclones connected in parallel or series, has long been known to be advantageous in the separation of particulate matter from a fluid stream. Typically, a relatively high speed fluid stream is introduced tangentially to a generally cylindrical or frusto-conical container, wherein the dirty air stream is accelerated around the inner periphery of the container. The centrifugal acceleration caused by the travel of the fluid in a cyclonic stream through the cyclone causes the particulate matter to be disentrained from the fluid flow and, eg., to collect at the bottom of the container. A fluid outlet is provided for the extraction of the fluid from the centre of the top of the cyclone container, as is well known in the art.

A typical flow path in a cyclone separator is as follows. Fluid to be treated is introduced tangentially at a fluid inlet located at an upper end of the cyclone container. The fluid stream rotates around the inner surface of the cyclone container, and spirals generally downwardly around the inner surface of the container (if the cyclone container is vertically disposed). At a bottom end of the cyclone container the fluid stream travels radially inwardly, generally along the bottom of the container and then turns upwardly and proceeds vertically up and out of the cyclone container. The particulate matter separating action of the cyclonic flow occurs substantially around the inner surface of the container. Once the fluid moves inwardly to the centre of the container, and upwardly there through, there is little or no dirt separation achieved.

The difficulty experienced with prior art cyclonic separators is the reentrainment of the deposited particles back into the outgoing fluid flow. Deposited particles exposed to a high speed cyclonic flow thereover have a tendency to be reentrained. This is particularly problematic when the container has a solid bottom portion in which the dirt collects. However, there is a potential reentrainment problem even if the bottom of the container has a passageway provided in the bottom thereof to convey the separated particulate material away from the container.

If a high degree of separation is required, it is known to connect a plurality of cyclones in series. While using several cyclones in series can provide the required separation efficiency, it has several problems. First, if the separators are to be used in industry, they generally need to accommodate a high flow rate (eg. if they are to be used to treat flue gas). The use of a plurality of cyclones increases the capital cost and the time required to manufacture and install the separators. Further, the use of a plurality of cyclones increases the space requirements to house the cyclones as well as the back pressure caused by the air flow through the cyclones. These latter issues are particularly acute for cyclone separators which are to be contained in a small housing, such as a vacuum cleaner. Accordingly, there is a need for an improved anti-reentrainment means for cyclonic separators.

SUMMARY OF THE INVENTION

In has now been discovered that a single cyclone having improved efficiency (eg. up to 99.9% efficiency) may be manufactured by positioning in the cyclone chamber a particle separation member for creating a dead air space beneath the cyclonic flow region of the cyclone chamber wherein the dead air space is in communication with the cyclonic flow region by a plurality of openings or apertures in the member. This construction effectively traps separated material beneath the cyclonic flow region and inhibits the reentrainment of the separated material. Thus, a single cyclone may be used in place of a plurality of cyclones to achieve the same separation efficiency.

As the fluid flow travels through the cyclone chamber, a boundary layer forms. Generally, the interior surface of a cyclonic chamber is smooth so as to provide for an uninterrupted cyclonic flow in the chamber. However, in the chamber, a boundary layer is still formed on all surfaces over which the fluid passes. According to the instant invention, the system (i.e. the motor means to move the fluid through the chamber, the fluid inlet to the chamber, the fluid outlet to the chamber and/or the construction of the separation member) is designed to minimize the thickness of the boundary layer in the vicinity of the apertures in the separation member.

In particular, as the fluid travels over the upper surface of the particle separation member, a boundary flow layer will form. The boundary layer will thicken until a thickness is reached at which the boundary layer has sufficient energy to break off and travel away from the upper surface. Generally at this point, the fluid travels upwardly to the fluid outlet from the cyclone. When the boundary layer breaks off from the upper surface, vortices are formed in the fluid stream adjacent the apertures in the separation member causing localized turbulence. The turbulent flow reentrains particles that had been separated from the fluid flow and may even pull some of the separated particles out of the dead air space beneath the cyclonic flow region of the cyclone chamber.

In accordance with the instant invention, there is provided a separator for separating entrained particles from a fluid flow, the separator comprising a cyclone chamber an outer wall and a cyclonic flow region, the cyclonic flow region having a radial width, an outer peripheral portion, a medial portion disposed interior of the peripheral portion and an inner portion disposed interior of the medial portion, a fluid inlet for introducing a cyclonic fluid flow to the cyclonic flow region, a fluid outlet for removing the fluid flow from the cyclone chamber, a particle separating member positioned in the cyclone chamber beneath at least a portion of the cyclonic flow region, the particle separating member having a plurality of apertures, and a particle receiving chamber disposed beneath the particle separating member for receiving particles passing into the particle receiving chamber through the apertures wherein the apertures are disposed on the particle separating member such that the medial portion of the cyclonic flow region is substantially free from said apertures.

The separator may be used in an upright vacuum cleaner. Accordingly, the separator may further comprise a cleaner head adapted for movement over a floor and having a fluid nozzle positionable adjacent the floor, the nozzle in fluid flow communication via a passageway with the separator fluid inlet, a handle for moving the cleaner head over the floor, and a casing for housing the cyclone chamber. The casing is preferably pivotally mounted to the cleaner head. The separator may be used in a canister or a central vacuum cleaner. Accordingly, the passageway may further comprise a flexible portion that is positioned external of the cleaner head and the casing and the handle is affixed to the cleaner head.

In one embodiment, the apertures are sized to inhibit elongate particles from passing there through, whereby elongate particles collect on top of the particle separating member.

In another embodiment, the apertures are shaped to aerodynamically direct particles from the cyclonic flow region into the particle receiving chamber.

The particle separating member may extend under all of the cyclonic flow region to define bottom surface of the cyclonic flow region. Alternately, it may extend only under that portion of the cyclonic flow region in which the apertures are to be provided. For example, the particle separating member may extend essentially under only the outer peripheral portion, the inner portion or both the peripheral and inner portions of the cyclonic flow region.

In accordance with the instant invention, there is also provided a separator for separating entrained particles from a fluid flow, the separator comprising a cyclone chamber for containing a cyclonic flow in a cyclonic flow region, the cyclonic flow region having a radial width, an outer peripheral portion, a medial portion disposed interior of the peripheral portion and an inner portion disposed interior of the medial portion, means for introducing a fluid flow to the cyclone flow region for cyclonic rotation therein, means for removing the fluid flow from the cyclone chamber, particle receiving means disposed beneath the cyclone flow region for receiving particles separated from the fluid flow, separation means for dividing the particle receiving means from the cyclone chamber, and transporting means associated with the separation means for connecting the particle receiving means in flow communication with the cyclonic flow region such that, in operation, particles pass through the transporting means to the particle receiving means wherein said transporting means are positioned outside the medial portion of the cyclonic flow region.

In one embodiment, the particle receiving means comprises a sealed chamber except for the transporting means and the separator further comprises emptying means for emptying the particle receiving means.

In another embodiment, the separator further comprises means for connecting the particle receiving means in flow communication with a conduit for transporting separated particles downstream from the particle receiving means.

In another embodiment, the separator further comprises aerodynamic means associated with the transporting means for directing particles from the cyclonic flow region into the particle receiving means.

In another embodiment, the particle separating means extends under all of the cyclonic flow region to define bottom surface of the cyclonic flow region.

In another embodiment, the transporting means are positioned beneath only one or both of the peripheral and inner portions of the cyclonic flow region.

In another embodiment, the transporting means are distributed regularly around the separating means.

In another embodiment, the fluid contacts only a portion of the separating means and the transporting means are positioned only in said portion.

In another embodiment, the transporting means comprise openings in the separation means.

In accordance with the instant invention, there is also provided a method for separating entrained particles from a fluid flow, the method comprising the steps of introducing a fluid to flow cyclonically in a chamber having a cyclonic flow region, the cyclonic flow region having a radial width, an outer peripheral portion, a medial portion disposed interior of the peripheral portion and an inner portion disposed interior of the medial portion, removing particles from the fluid flow in the cyclone chamber via passages provided beneath one or both of the peripheral and inner portions, and removing the fluid flow from the chamber.

In one embodiment, the method further comprises the steps of storing the particles removed from the fluid flow and inverting the chamber to remove the separated particles.

In another embodiment, the method further comprises the step of transporting separated particles downstream from the chamber.

In another embodiment, the separator comprises the dirt separation mechanism for a vacuum cleaner and the method further comprises passing a cleaning head over a surface to clean the surface.

In another embodiment, the method further comprises directing particles to pass into the passages.

In another embodiment of the instant invention, the cyclonic separator is constructed to minimize the thickness of the boundary layer when it breaks off thereby reducing turbulent flow in the vicinity of the apertures. This may be achieved by varying one or more of the number of apertures in the particle separation member, the length of the apertures, the width of the apertures, the included angle between the upstream edge of the apertures and the upper surface of the particle separation member, the included angle between the downstream edge of the apertures and the upper surface of the particle separation member, and the position of a baffle beneath the particle separation member with respect to the point at which the cyclonic air flow changes direction at the bottom of the cyclone chamber. The actual design of the system will changes in the size of the cyclone chamber, the velocity of the fluid flow in the cyclone chamber and the viscosity of the fluid flow in the cyclone chamber.

In another embodiment, the flow of the fluid itself may be modified to minimize the thickness of the boundary layer when it breaks off. For example, the fluid flow may be pulsed with the frequency of the pulses set to reduce the maximum thickness of the boundary layer. By pulsing the fluid flow, the fluid flow is cyclically accelerated and decelerated. This cycling is set to encourage the boundary layer to break off when it is thinner than when the fluid flow is not pulsed. The acceleration after the deceleration provides sufficient energy to cause the boundary layer to delaminate sooner than it would in a constant flow regime thereby reducing turbulent flow in the vicinity of the apertures. This pulsed flow may be achieved in several ways such as by sending a pulsed electrical signal to the fluid pump which produces the fluid flow through the cyclone chamber, by pulsing the fluid as it passes through the cyclone air inlet (eg. the inlet may have an aperture that may be cyclically opened and closed at produce the pulsed flow), by pulsing the fluid as it passes through the cyclone air outlet (eg. the outlet may have an aperture that may be cyclically opened and closed at produce the pulsed flow), or by rotating the particle separation member in its plane (eg. by mounting the particle separation member with a spring biasing means so that the particle separation member will cyclically rotate clockwise and then counter clockwise).

The prior art teaches the need for a plurality of cyclones in order achieve ultra-high particle separation efficiencies. However, it has been found that ultra-high efficiencies can be obtained in a single stage cyclone incorporating the particle separation member of the present invention. Accordingly, cleaning efficiencies in excess of 99% may be obtained with a single stage separator utilizing a separator according to the present invention, thereby negating the need for second stage cyclonic separation altogether. Cleaning efficiencies of over 99.5% have also been achieved for particle laden air streams.

In accordance with this aspect of the instant invention, there is provided a separator for separating entrained particles from a fluid flow, the separator comprising a separator for separating entrained particles from a fluid flow, the separator comprising:

(a) a cyclone chamber having an outer wall and a cyclonic flow region;

(b) a fluid inlet for introducing a cyclonic fluid flow to the cyclonic flow region;

(c) a fluid outlet for removing the fluid flow from the cyclone chamber;

(d) a particle separation member positioned in the cyclone chamber beneath at least a portion of the cyclonic flow region, the particle separation member having an upper surface and plurality of apertures; and, (e) a particle receiving chamber disposed beneath the particle separation member for receiving particles passing into the particle receiving chamber through the apertures wherein the separator is constructed to reduce turbulent fluid flow in the vicinity of the apertures.

In accordance with the instant invention, there is also provided a separator for separating entrained particles from a fluid flow, the separator comprising:

(a) a cyclone chamber for containing a cyclonic flow in a cyclonic flow region;

(b) fluid entry means for introducing a fluid flow to the cyclone flow region for cyclonic rotation therein;

(c) fluid exit means for removing the fluid flow from the cyclone chamber;

(d) fluid pump means for causing fluid flow through the cyclone chamber;

(e) particle receiving means disposed beneath the cyclone flow region for receiving particles separated from the fluid flow;

(f) separation means for dividing the particle receiving means from the cyclone chamber;

(g) transporting means associated with the separation means for connecting the particle receiving means in flow communication with the cyclonic flow region such that, in operation, a boundary layer flow of fluid develops over the separation means and the particles disentrained from the fluid flow pass through the transporting means to the particle receiving means; and, (h) means for reducing the thickness of the boundary layer of fluid as it travels over the separation means.

In one embodiment, the means for reducing the thickness of the boundary layer comprises means for pulsing the fluid flow through the cyclone chamber. The means for pulsing the fluid flow through the cyclone chamber may comprise means for pulsing an electrical signal to the fluid pump means. Alternately, or in addition, the means for pulsing the fluid flow through the cyclone chamber may comprise means pulsing for cyclically opening and closing one of the fluid entry means and the fluid exit means.

In another embodiment, the means for reducing the thickness of the boundary layer comprises constructing and positioning the transporting means to reduce turbulent fluid flow over the separation means.

In another embodiment, the means for reducing the thickness of the boundary layer comprises constructing and positioning flow disruption means beneath the separating means for disrupting cyclonic fluid flow in the particle receiving means.

In another embodiment, the particle receiving means comprises a sealed chamber except for the transporting means and the separator further comprises emptying means for emptying the particle receiving means.

In accordance with the instant invention, there is also provided a method for separating entrained particles from a fluid flow, the method comprising the steps of:

(a) introducing a fluid to flow cyclonically in a chamber having a cyclonic flow region and a particle separation member positioned in the cyclone chamber to define a particle receiving chamber;

(b) adjusting the back pressure in the chamber to promote the formation of a laminar boundary layer adjacent the particle separation member;

(c) removing particles from the fluid flow in the cyclone chamber via passages provided in the particle separation member; and, (d) removing the fluid flow from the chamber.

In one embodiment, the method further comprises the steps of storing the particles removed from the fluid flow and inverting the chamber to remove the separated particles.

In another embodiment, the particle separation member is constructed and positioned to reduce turbulent fluid flow over the particle separation member in the vicinity of the passages and the method further comprises passing the fluid flow over the particle separation member during operation of the chamber.

In another embodiment, the chamber further comprises further comprising flow disruption means which is constructed and positioned beneath the separating means for disrupting cyclonic fluid flow in the particle receiving chamber to reduce turbulent fluid flow over the particle separation member in the vicinity of the passages and the method further comprises passing the fluid flow over the particle separation member during operation of the chamber.

In accordance with the instant invention, there is also provided a vacuum cleaner comprising:

(a) a cyclone chamber having an outer wall and a cyclonic flow region;

(b) a fluid inlet for introducing a cyclonic fluid flow to the cyclonic flow region;

(c) a cleaner head adapted for movement over a surface and having a fluid nozzle positionable adjacent the surface, the nozzle in fluid flow communication via a passageway with the fluid inlet;

(d) a fluid outlet for removing the fluid flow from the cyclone chamber;

(e) a particle separation member positioned in the cyclone chamber beneath at least a portion of the cyclonic flow region, the particle separation member having an upper surface and plurality of apertures; and, (f) a particle receiving chamber disposed beneath the particle separation member for receiving particles passing into the particle receiving chamber through the apertures, wherein the separator is constructed to reduce turbulent fluid flow in the vicinity of the apertures.

In accordance with the instant invention, there is also provided a vacuum cleaner comprising:

(a) a cyclone chamber having an outer wall and a cyclonic flow region;

(b) a air inlet for introducing a cyclonic air flow to the cyclonic flow region;

(c) a cleaner head adapted for movement over a surface and having a air nozzle positionable adjacent the surface, the nozzle in air flow communication via a passageway with the air inlet;

(d) a air outlet for removing the air flow from the cyclone chamber;

(e) a particle separation member positioned in the cyclone chamber beneath at least a portion of the cyclonic flow region, the particle separation member having an upper surface and plurality of apertures;

(f) a particle receiving chamber disposed beneath the particle separation member for receiving particles passing into the particle receiving chamber through the apertures; and, (g) a motor for causing the air to flow through the vacuum cleaner wherein the air flow through the cyclone chamber is pulsed.

In one embodiment, the vacuum cleaner further comprises a moveable closure member on one of the air inlet and the air outlet for causing a pulsed air flow through the cyclone chamber.

In another embodiment, the motor receives an electrical signal and the electrical signal is pulsed to produce the pulsed air flow.

In accordance with the instant invention, there is also provided a vacuum cleaner comprising:

(a) a cyclone chamber having an outer wall and a cyclonic flow region;

(b) a air inlet for introducing a cyclonic air flow to the cyclonic flow region;

(c) a cleaner head adapted for movement over a surface and having a air nozzle positionable adjacent the surface, the nozzle in air flow communication via a passageway with the air inlet;

(d) a air outlet for removing the air flow from the cyclone chamber;

(e) a particle separation member positioned in the cyclone chamber beneath at least a portion of the cyclonic flow region, the particle separation member having an upper surface and plurality of apertures;

(f) a particle receiving chamber disposed beneath the particle separation member for receiving particles passing into the particle receiving chamber through the apertures; and, (g) a handle for moving the cleaner head over the floor; and, (h) a motor for causing the air to flow through the vacuum cleaner wherein the particle separation member is constructed and adapted to increase the particle separation efficiency of the cyclone chamber.

In one embodiment, the particle separation member has from 5 to 35 apertures.

In another embodiment, the number of apertures in the particle separation member is calculated by the formula:

$$\text{number of apertures} = \frac{H}{D} \times 4 \pm 20\%$$

where H=the vertical height of the cyclonic flow region
D=the diameter of the cyclone chamber In another embodiment, the cyclone chamber has a diameter and each aperture has a longitudinally extending upstream edge and a longitudinally extending downstream edges, relative to the air flow, and transverse sides extending between the edges, the edges have a length which is less than 10% of the diameter of the cyclone chamber and the sides have a length which is 25-35% of the length of the edges.

In another embodiment, the edges are substantially radially aligned with the cyclone chamber.

In another embodiment, each aperture has an upstream edge and a downstream edge, relative to the air flow, and the upstream edge is angled towards the particle receiving chamber, the included angle between the upstream edge and the upper surface of the particle separation member is from 15 to 90°.

In another embodiment, each aperture has an upstream edge and a downstream edge, relative to the air flow, and the downstream edge is angled towards the particle receiving chamber, the included angle between the downstream edge and the upper surface of the particle separation member is from 15 to 90°.

In another embodiment, the air flow changes direction and travels to the air outlet at a position as it travels over the particle separation member and the vacuum cleaner further comprising a baffle positioned beneath the particle separation member at a position 10 to 20° downstream of the position at which the air flow changes direction.

In another embodiment, the particle receiving chamber has a bottom to comprise a sealed chamber except for the apertures and the baffle extends between the particle separation member and the bottom of the particle receiving chamber.

BRIEF DESCRIPTION OF THE DRAWINGS

For a better understanding of the present invention, and to show more clearly how it may be carried into effect, reference will now be made by way of example to the accompanying drawings of a preferred embodiment of the present invention, in which.

DETAILED DESCRIPTION OF THE PREFERRED EMBODIMENT

The improvements in cyclonic separators described herein may be used with or in place of cyclonic separation devices of any sort which are used to separate particulate material from a fluid stream. For example, they may be used with a fluid stream consisting of one or more gasses such as industrial dust collection systems (eg. flue gas scrubbing), they may be used to classify particles according to their size or they may be used with a fluid stream consisting of one or more liquids (eg. a hydrocyclone) or with fluid streams comprising a gas/liquid mixture. It will be appreciated that they these cyclone separators may be used in any manner known in the particle separation art.

For example, the separation member according to the present invention may also be employed in the classification and/or sorting of particles by size. Particles to be sorted are entrained in a fluid flow and introduced to a cyclonic separator having a separation member according to the present invention, the separation member having a first aperture size. Particles smaller than the first aperture size are permitted to pass through the separation member and into a hopper for transfer to a subsequent cyclonic separator while larger particles are collected on top of the particle separator. The particle passing through the separation member are introduced cyclonically to a second cyclone having a separation member with apertures of a second, smaller size, relative to the first cyclone. As in the first cyclone, particles smaller than the second aperture size are permitted to pass through the separation member and into a hopper for transfer to a third cyclonic separator, while larger particle remain on the separation member in the second cyclone chamber. This process is repeated, as required, until the particles are classified as needed.

Figure 1:
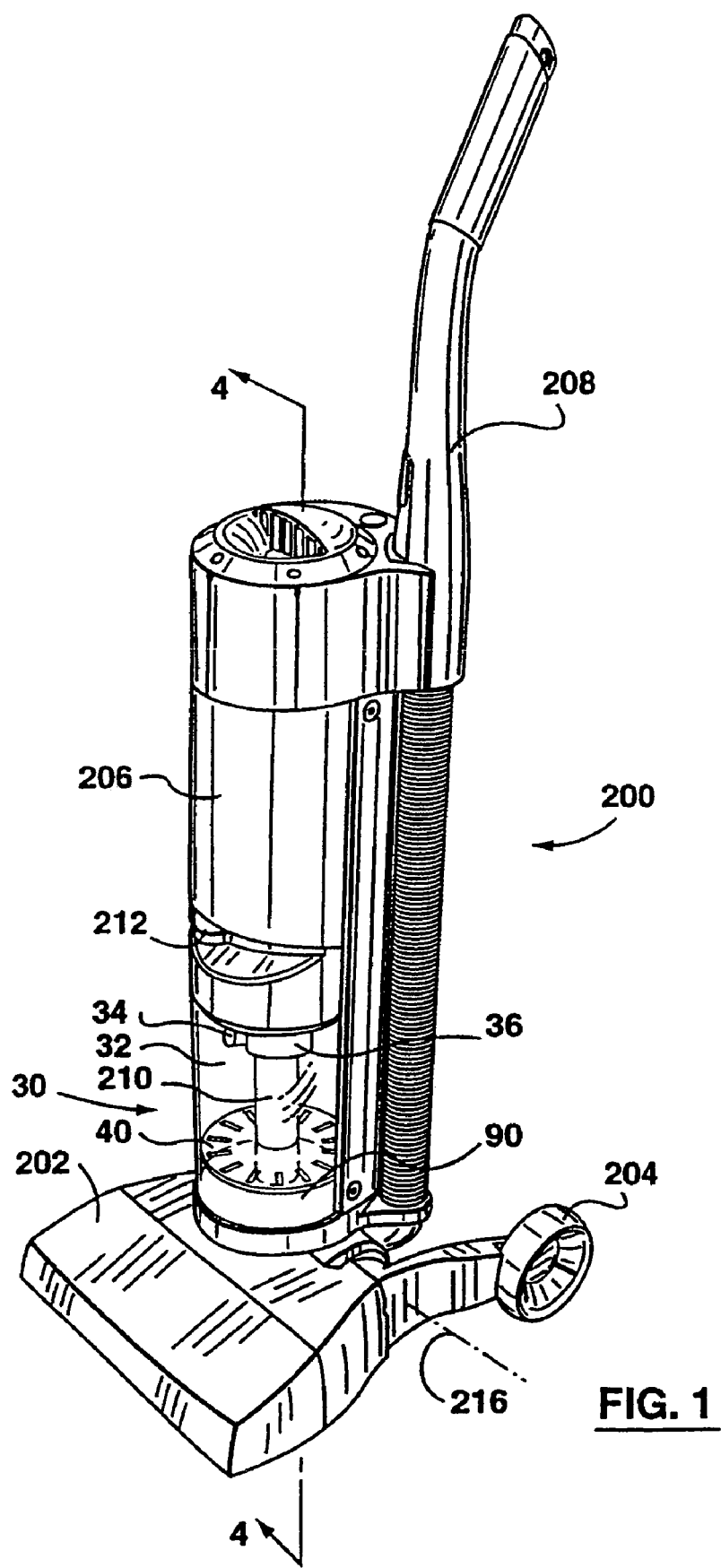
FIG. 1 is a perspective view of a household vacuum cleaner incorporating a cyclone separator according to the present invention.
Figure 2:
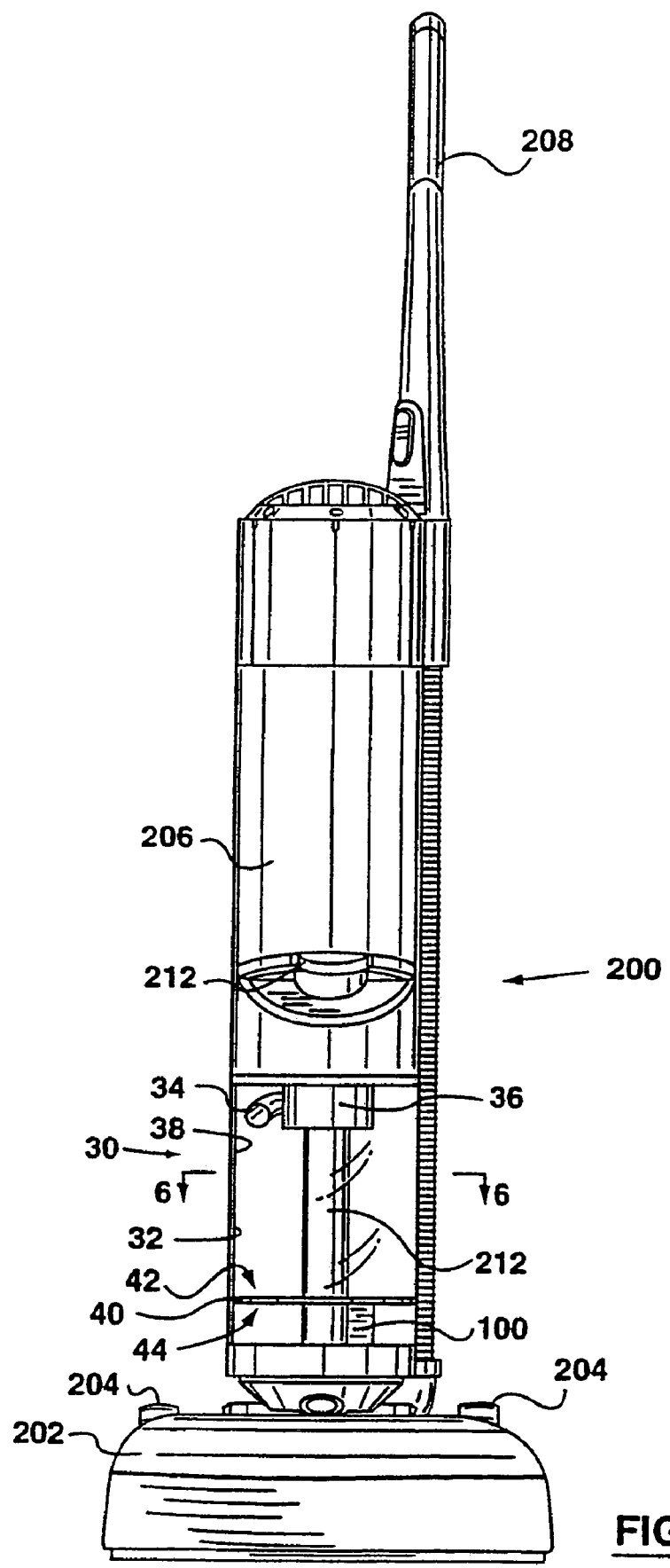
FIG. 2 is a front elevational view of the vacuum cleaner of FIG. 1.
Figure 3:
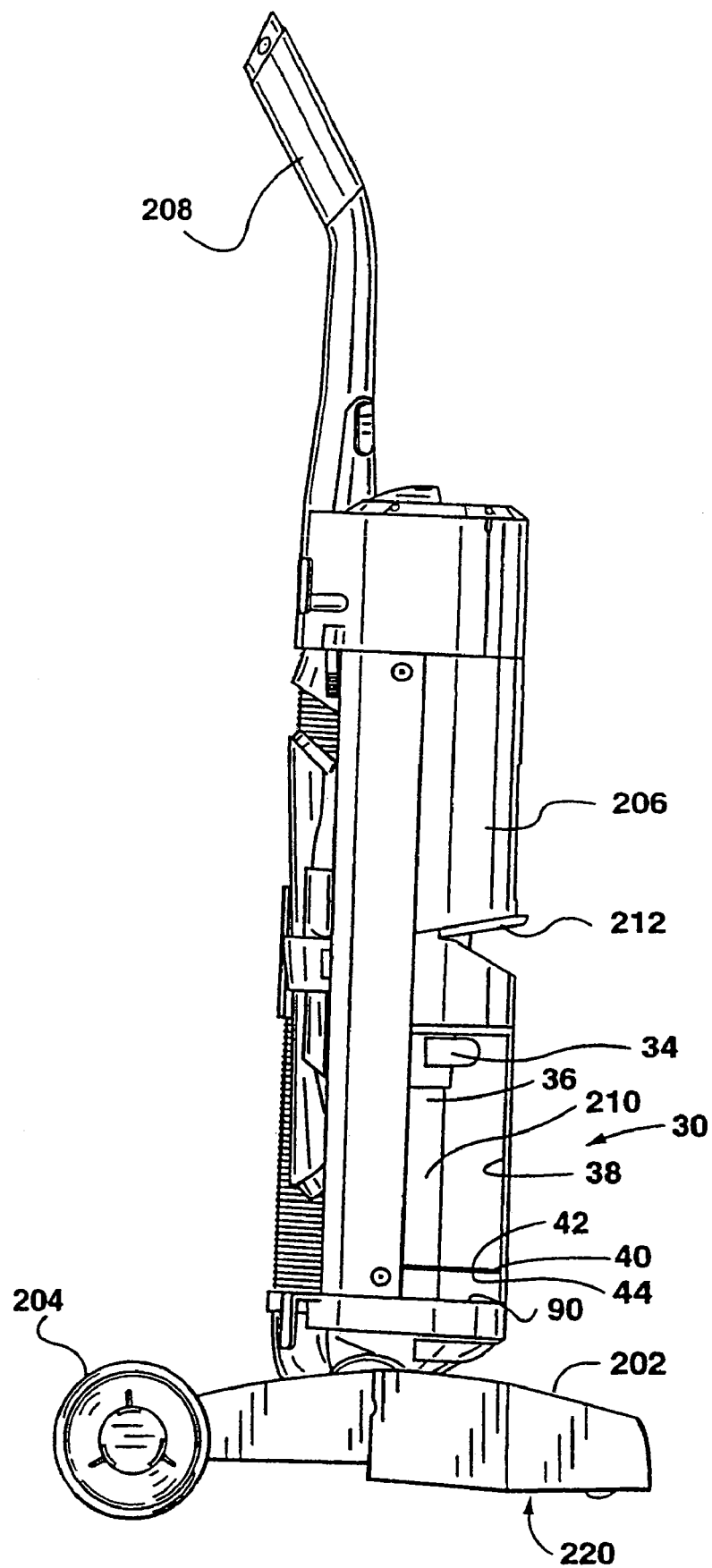
FIG. 3 is a side elevational view of the vacuum cleaner of FIG. 1.

In one preferred embodiment, the cyclonic separator is used as a dirt separation means of a vacuum cleaner. As shown in FIG. 1, as the cyclonic separator of this invention may have a dirt separation efficiency of 99.95% or higher, the vacuum cleaner may use only a single cyclonic separator and, in fact, the single cyclonic separator of this invention may be the only dirt separation means used in the vacuum cleaner. As is known in the art after filters (i.e. a filter positioned downstream from the motor of the vacuum cleaner) may optionally be provided, eg. a HEPA filter to remove very small quantities of particulate matter such as the carbon dust which is produced by the motor.

Figure 5:
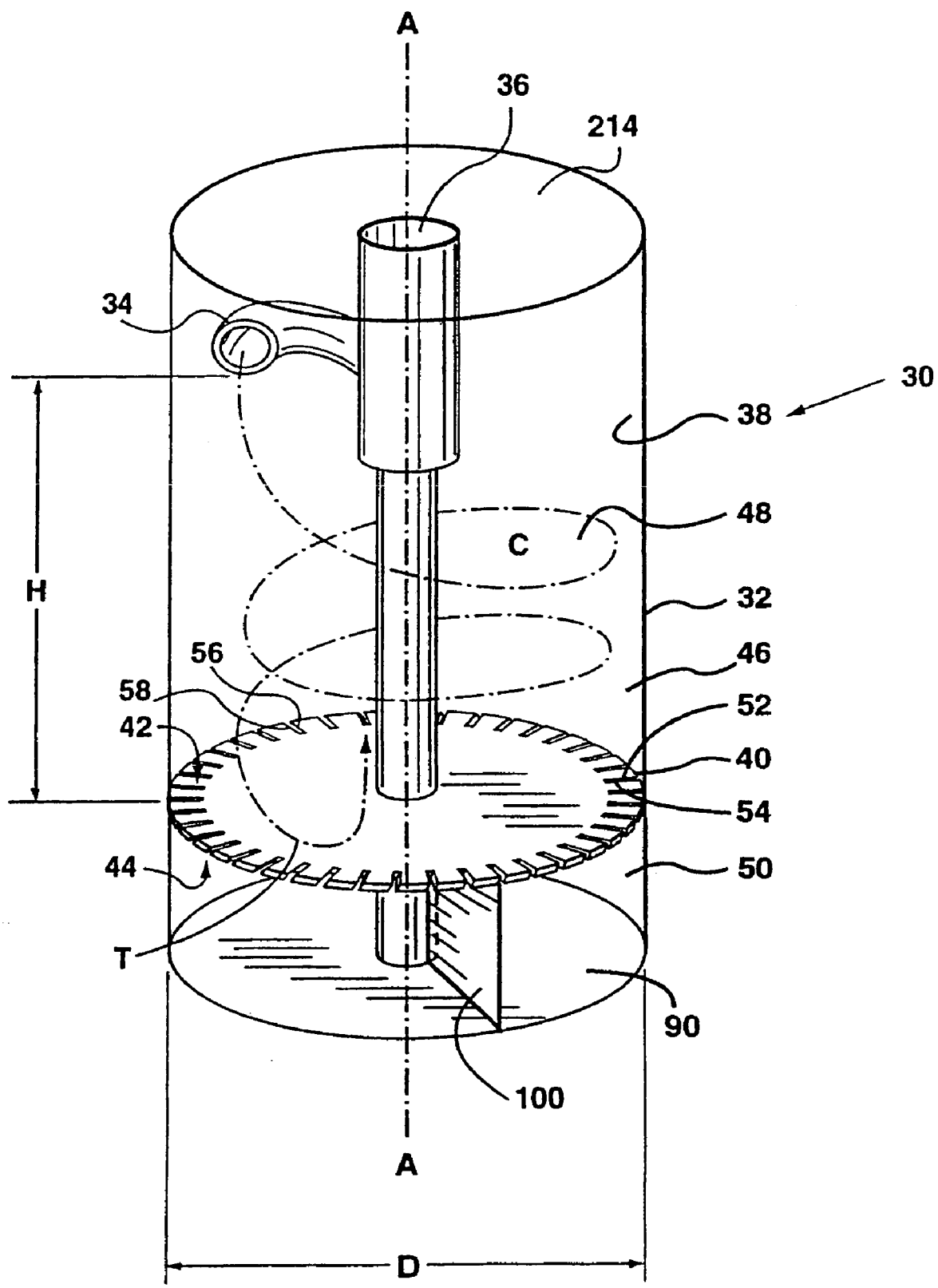
FIG. 5 is a cut away perspective view of the cyclonic separation member of FIG. 1 when removed from the vacuum cleaner.

In the application as exemplified in FIGS. 1 and 5, particle separation member 30 is shown as the cyclone separator for vacuum cleaner 200. While separator 30 may be used in any vacuum cleaner (eg. an upright, a canister, a backpack cleaner or a central vacuum cleaning system), the following discussion describes the use of particle separation member 30 in an upright vacuum cleaner.

Figure 4:
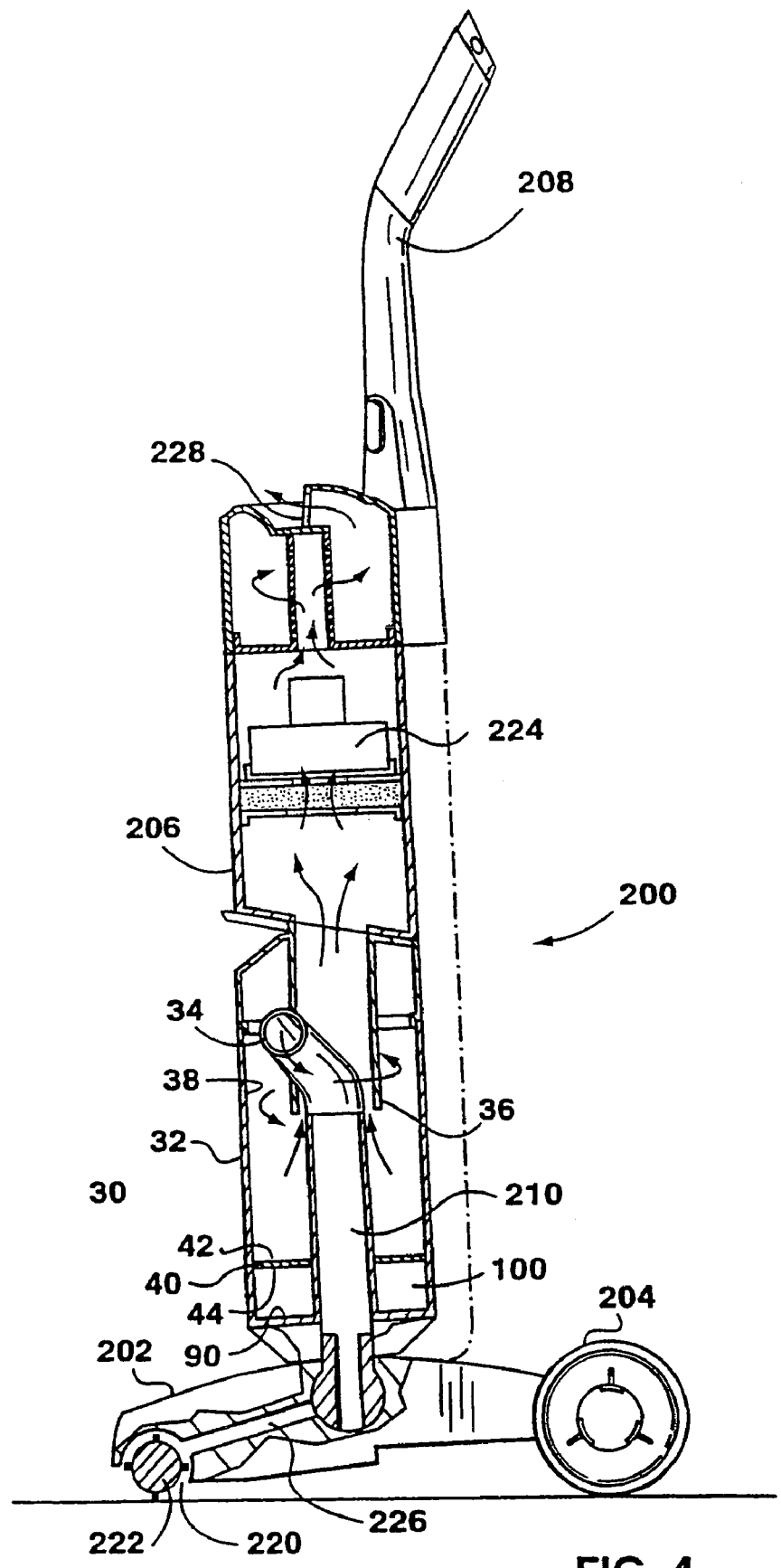
FIG. 4 is a cross-sectional view along the line 4-4 in FIG. 1.

As exemplified in FIGS. 1 and 5, vacuum cleaner 200 has a floor cleaning head 202, means for moving cleaning head 202 across a floor (eg. wheels 204), main casing 206 rotatably attached to cleaner head 202, and a handle 208 for moving cleaner 200 across the floor. Main casing 206 houses separator 30. In this embodiment, a single separator 30 is used and comprises a central air feed conduit 210 in air flow communication with dirty air inlet 220 adjacent the floor in cleaner head 202 (see FIGS. 4 and 5) at one end and in air flow communication with curved air inlet 34 at the other end. Rotatably mounted brush 222 may be positioned in dirty air inlet 220.

Figure 21:
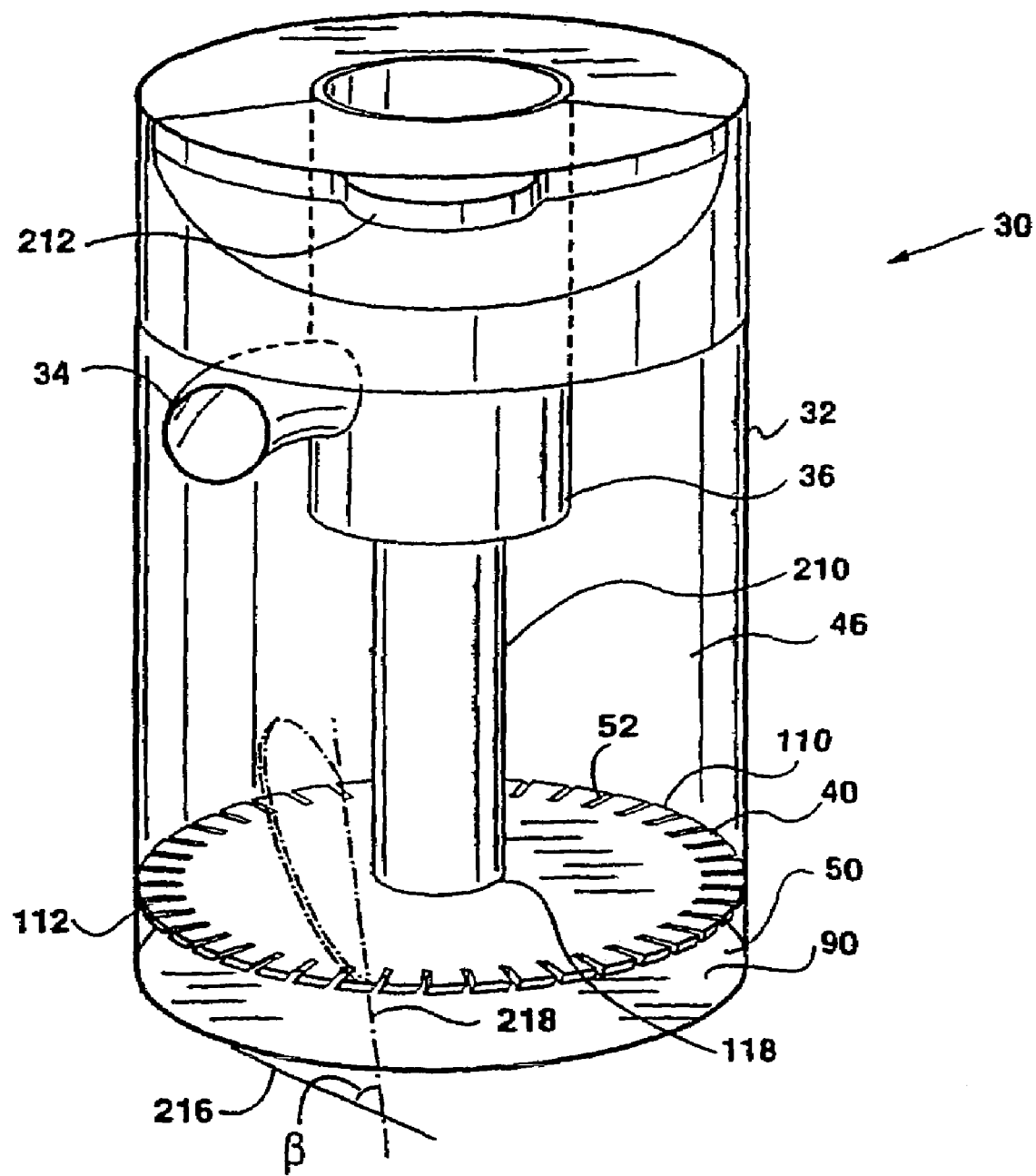
FIG. 21 is an enlarged perspective view of the bin of FIG. 1 when removed from the vacuum cleaner; and, FIG. 22 is an enlarged perspective view of the access member of FIG. 21.

Bin 32 may be removable from main casing 206 by any means known in the art (see FIG. 21), such as by the application of pressure by the hand of a user to handle 212, so that collected dirt may be removed from bin 32.

Cyclonic separator 30 comprises a bin 32 having an open end 214, an inlet 34 for delivering a cyclonic fluid flow to separator 30 and an outlet 36 for removing fluid from the separator. Inlet 34 need not be tangential but may be of any configuration which is capable of providing a cyclonic fluid flow to bin 32, such as an axial or screw cyclone inlet. Disposed in a lower portion of bin 32 is a separation member 40 which comprises a flat, disc-like member, having an upper face 42 and a lower face 44, and which substantially divides bin 32 into a cyclone chamber 46, having a cyclonic flow region 48 defined therein, and a particle receiving chamber 50. Separation member 40 may be made of plastic plate having a thickness of, eg. $\frac{1}{40}$ of the diameter of bin 32. Cyclone chamber 46 and particle receiving chamber 50 communicate only via a plurality of apertures 52 in separation member 40. Apertures 52 comprise a plurality of openings or slits 54, each having an upstream edge 56 and a downstream edge 58 relative to the direction of cyclonic fluid flow in cyclone chamber 46 (arrow C), longer than the transverse width and oriented generally radially with respect to bin 32 (see FIG. 5). Particle receiving chamber 50 comprises a chamber extending between lower face 44 and bottom face 90 of bin 32. Particle receiving chamber 50 preferably comprises about 10% of the volume of bin 32.

In use, a particle-laden fluid stream is introduced to cyclone chamber 46 via inlet 34 to flow cyclonically therein. The cyclonic flow proceeds rotationally around and downwardly through bin 32. The fluid stream is accelerated as it comes into the region of influence of particle separation member 40 which causes the fluid to change direction towards the central portion of cyclonic flow region 48 in cyclone chamber 46 (eg. around central air feed conduit 210) and is ultimately removed from cyclone chamber 46 via outlet 36. As the cyclonic fluid flow moves cyclonically down along inner wall 38 of cyclone chamber 46, it encounters separation member 40 and travels across separation member 40. The change in speed and direction of the fluid stream as it flows through cyclone chamber 46 causes particles entrained in the fluid stream to become disentrained. These separated particles have a greater mass and continue to accelerate towards separation member 40 where (depending on particle size) they pass through apertures 52 into particle receiving chamber 50. The separated particulate matter collects in particle receiving chamber 50. Larger particles separated from the fluid flow by the cyclonic action and incapable of passing through apertures 52 accumulate on upper surface 42 of separation member 40.

The reentrainment of deposited particles into the cyclonic flow is related to the speed and degree of cyclonic flow of fluid passing over deposited particles. Accordingly, any reduction in the cyclonic flow of the fluid within the particle receiving chamber will beneficially enhance the anti-reentrainment properties of the separator. To that end, referring to FIG. 11 particle receiving chamber 50 may be provided with one or more baffles 100. The baffles operate to reduce and preferably stop the cyclonic flow of air beneath particle separation member 40. Thus particle receiving chamber 50 forms a dead air space beneath cyclonic flow region 48.

It will thus be appreciated that separation member 40 assists in particle separation in several ways. First, by providing a discontinuous surface, it disrupts the cyclonic flow thus assisting in separating entrained particulate matter from the fluid stream. Secondly, if provides an area (particle receiving chamber 50) which is separate from cyclone chamber 46. If a portion of the fluid stream enters particle receiving chamber 50, the cyclonic flow may be slowed or terminated thus allowing entrained particulate matter to separate out without the potential for reentrainment.

In use, an air flow is created by a motor 224 (eg. the fluid pump means) in vacuum cleaner 200 to draw air from, eg., from dirty air inlet 220, through passageway 226 in cleaner head 202, through centre air feed conduit 210 and into cyclone chamber 46 via inlet 34. Cyclonic flow is maintained in cyclone chamber 46 thereby causing particles entrained in the cyclonic flow to be deposited, with smaller particles passing through apertures 52 into particle receiving chamber 50, while larger particles (eg. elongate particles such as hair, carpet fibres and the like) are deposited on upper surface 42 of separation member 40. Air then exits cyclone chamber via air outlet 36, though motor 224 and then exits the cleaner via outlet 228. The finer dirt tends to be separated and deposited in particle receiving chamber 50. Therefore, after operation of vacuum cleaner 200, particles of varying size may have collected in bin 32 both above and below separation member 40.

Figure 7:
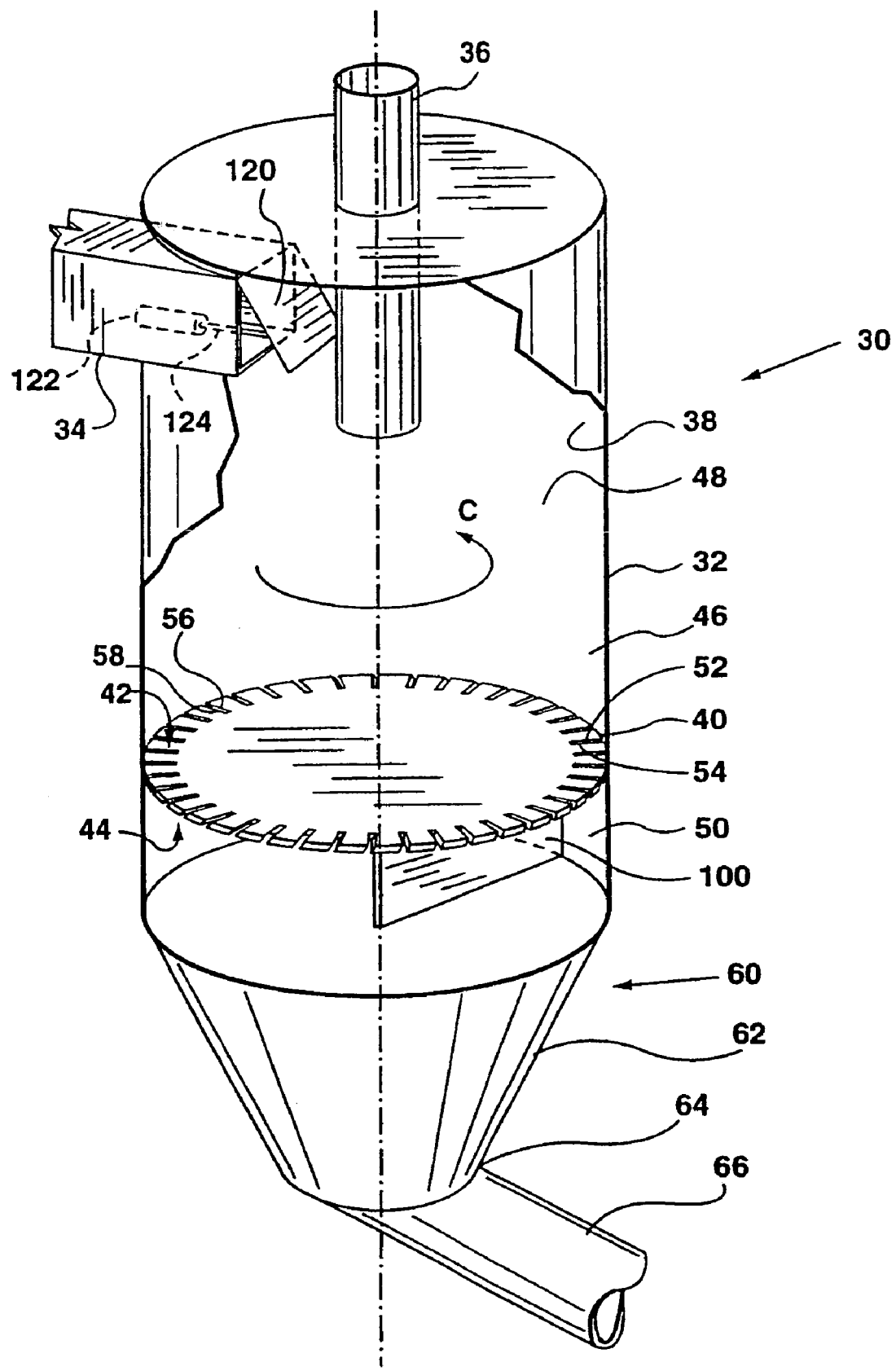
FIG. 7 is a cut away perspective view of an alternate embodiment of the cyclonic separation member of FIG. 5.

In the embodiment of FIG. 7, cyclonic separator 30 is used to separate material entrained in an industrial fluid stream. In order to allow the separated material to be collected without interrupting the flow of fluid through cyclonic separator 30, particle receiving chamber 50 is provided with a hopper 60 having a sloping wall 62 leading to a hopper exit 64. Hopper exit 64 communicates with a particle transport conduit 66 for transporting received particles away from receiving chamber 50. Hopper 60 collects separated particles for removal by transport conduit 66 (such as due to gravity flow).

It will be appreciated that cyclone chamber 46 may be of any design known in the art. Inner wall need not be cylindrical as shown in FIG. 1 but may be of any shape known in the art. Further, inlet 34 and outlet 36 may be positioned at any location and more than one inlet and outlet may be used.

Figure 6:
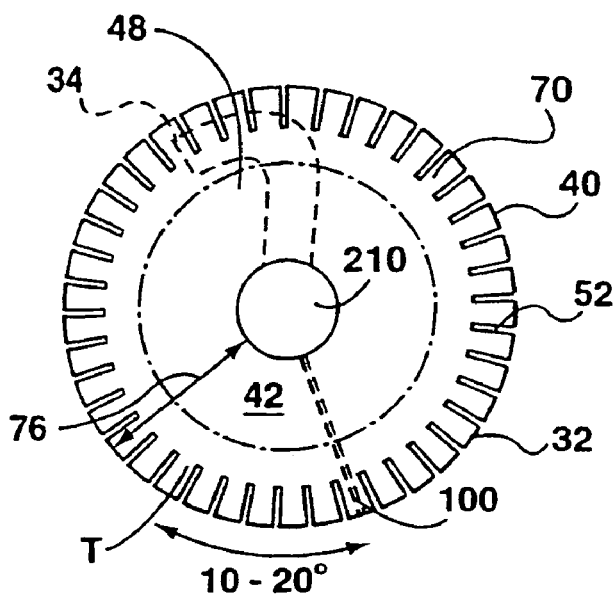
FIG. 6 is a cross-sectional view along the line 6-6 in FIG. 2 with the bin removed.

The location of apertures 52 have been found to affect the particle separation characteristics of separation member 40 for a given cyclone configuration and application. It has been found that the anti-reentrainment characteristics of separation member 40 are enhanced if apertures 52 are concentrated beneath peripheral portion 70 of cyclonic flow region 48 (see FIG. 6), inner portion 72 of cyclonic flow region 48 (see FIG. 8), or both peripheral portion 70 and inner portion 72 (see FIG. 9) thereby leaving medial portion 74 substantially free from apertures 52. If apertures 52 are provided beneath medial portion 74 without any means provided in particle receiving chamber 50 for preventing any substantial (and preferably all) cyclonic flow in particle separating chamber 50, then some of the particulate material in particle separation chamber 50 will be reentrained into the air flow in cyclone chamber 46. Accordingly, it is preferred that there are no apertures 52 beneath medial portion 74 when there are no means (eg. baffles) to prevent cyclonic flow in particle separation chamber 50. It will be appreciated that a few apertures 52 may be provided in medial portion 74 without creating substantial reentrainment.

Preferably, peripheral portion 70 comprises approximately the outermost one quarter of the radial width 76 of cyclonic flow region 48, and inner portion 72 comprises approximately the innermost one quarter of the radial width 76 of cyclonic flow region 48. Medial portion 74 therefore comprises half of the radial width 76.

Figure 8:
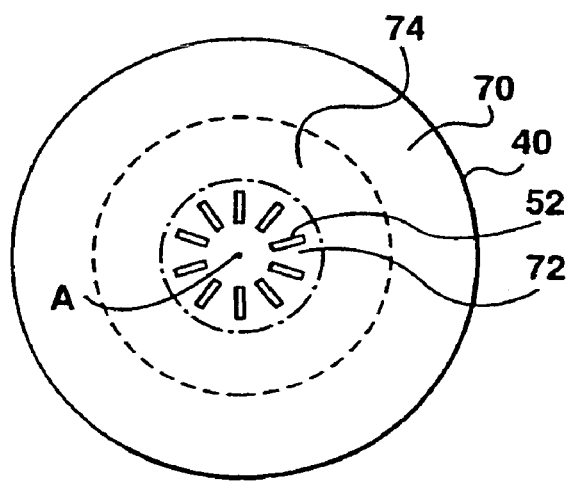
FIGS. 8 and 9 are cross-sectional views along the line 6-6 in FIG. 2 showing alternate configurations of the particle separation member of the present invention.
Figure 9:
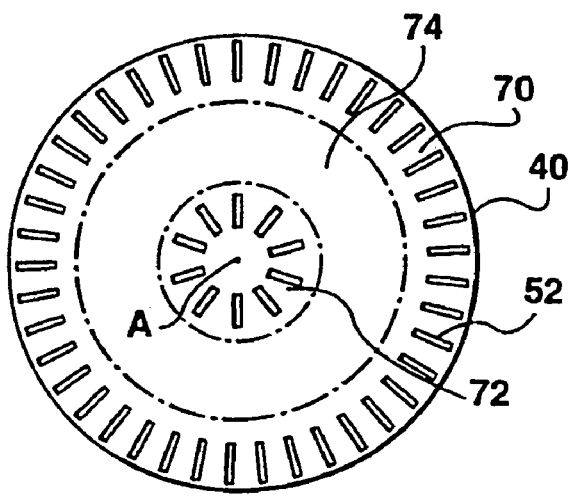

If a cyclone separator configuration is varied, the shape and size of cyclonic flow region 48 will vary. For example, referring to FIG. 6, cyclone bin 32 having central air feed conduit 210 results in an annular-shaped cyclonic flow region 48. As a result, cyclonic flow region 48 has a radial width 76 between central air feed conduit 210 and inner wall 38. However, if there is no member positioned in bin 32 (as shown in FIGS. 8 and 9), then cyclonic flow region 48 has a radial width 76 which extends from central axis A to inner wall 38. Bin 32 may have a non-circular cross-section (eg. elliptical) or any non-curvilinear cross-section which permits a substantially cyclonic flow therein. Also, the radial width of cyclone chamber 46 may vary along its longitudinal length (i.e. in the direction of axis A), and may be, eg., cylindrical, frusto-conical or any other shape having beneficial cyclonic particle separation characteristics.

Figure 14:
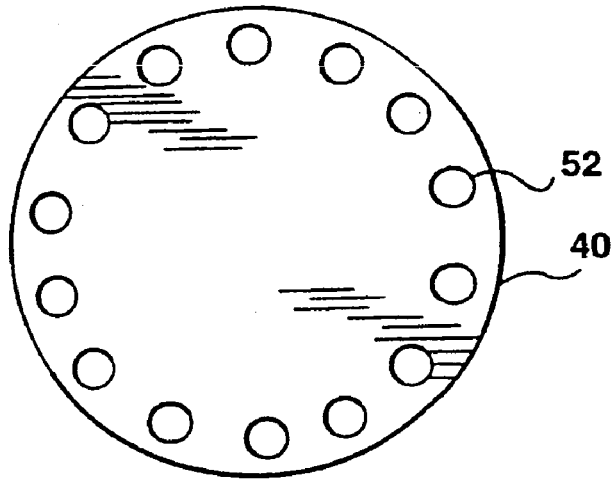

Apertures 52 may be of any particular shape. For example, they may be circular (see FIG. 14), rectangular (see FIG. 19), triangular, or other regular or irregular shape. Preferably, if apertures 52 are located against the inner or outer edge of separation member 40, then they have only one wall 57. For example, as shown in FIG. 5, apertures 52 extend all the way to inner wall 38 of bin 32 while in FIG. 9 they terminate inwardly of inner wall 38. While apertures 52 may be any shape, in a preferred embodiment, they have a length greater than their width. In particular, as shown in FIG. 11, upstream and downstream edges 56, 58 are preferably longer than the spaced opposed sides 57 extending between edges 56, 58 (eg. edges 56, 58 are preferably at least twice the length of sides 57) so that apertures 52 define slits.

Figure 11:
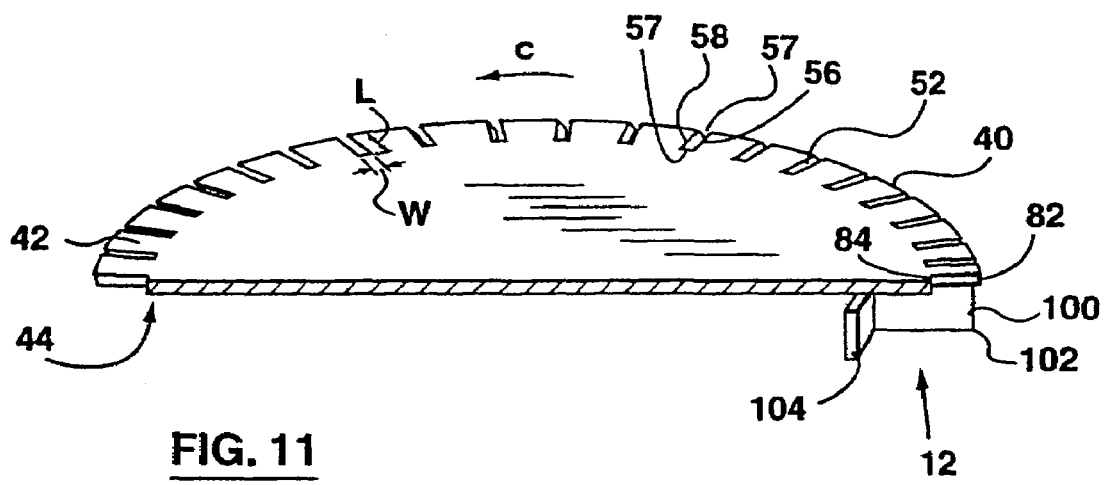
FIG. 11 is a sectional perspective view of the particle separator member having baffle members according to the present invention.
Figure 13:
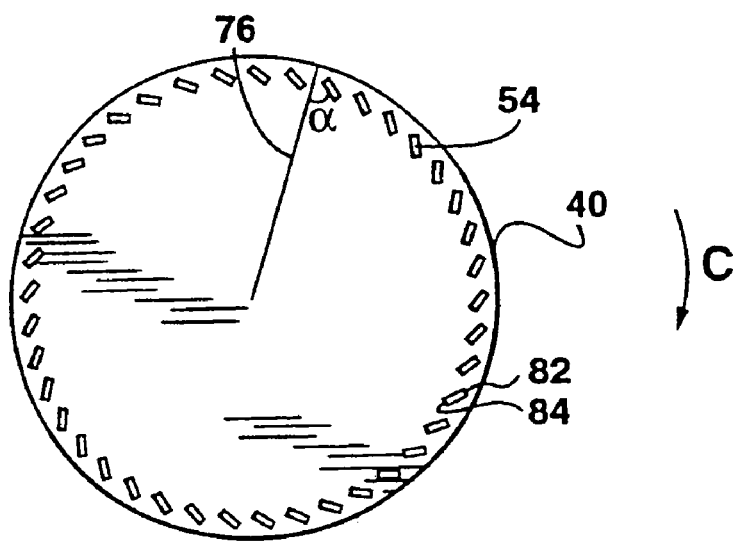
FIGS. 13-15 are top plan views of various alternate configurations of the particle separation member of the present invention.

As shown in FIG. 11, slits 54 may extend generally radially (i.e. edges 56, 58 may extend generally radially). However, as shown in FIG. 13, slits 54 may be angled slightly, relative to radial width 76, so that the outer edge 82 of an aperture 52 is upstream of the inner edge 84, relative to the cyclonic air flow (indicated by arrow C). The angle a of slits 54 relative to radial width 76 may be up to 45°.

Preferably apertures 52 extend radially and edges 56, 58 have a length L which is about 10% or less of diameter D of bin 32 and sides 57 have a length W (i.e. the width of the apertures) which is about 5% or less of diameter D of bin 32 (see FIG. 11). More preferably, length W is about 25 to 35% of length L.

Figure 15:
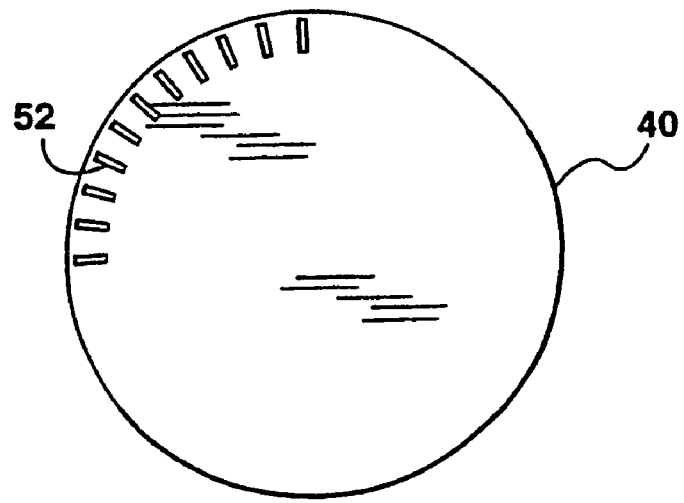

Apertures 52 may be equidistantly spaced apart around separation member 40 (see FIGS. 6-9) or they may be positioned with different spacings between adjacent apertures 52. Further, apertures 52 may be continuously positioned around all of separation member 40 (see FIGS. 6-9) or apertures 52 may be positioned around only a portion of separation member 40 (see FIG. 15). Distributing apertures 52 over only a region may be beneficial where only a portion of dirt separation member 40 is contacted by the cyclonic flow in bin 32. This may be used, for example, if bin 32 has a single inlet 34. In such a case, the sector of separation member 40 which will be contacted by the cyclonic flow may be predetermined and apertures 52 provided only in that sector.

Preferably, particle separation member 40 will have from about 5 to about 35 apertures 52. The number of apertures 52 which may be required for a particular system may be determined by the formula:

$$\text{number of apertures} = \frac{H}{D} \times 4 \pm 20\%$$

where H=the vertical height of cyclonic flow region 48
D=the diameter of bin 32 (see FIG. 5)

The formula provides a rough approximation of the ideal number of apertures 52 for a particular system (i.e. within 20%). The actual number of apertures which are required for maximum separation efficiency for a particular system may vary slightly from the formula.

It should be noted that dust separation member 40 need not be positioned perpendicular to the cyclonic (ie. longitudinal) axis of cyclonic flow region 48 in cyclone chamber 46. In particular separation member 40 may be at an angle to the axis.

Figure 16:
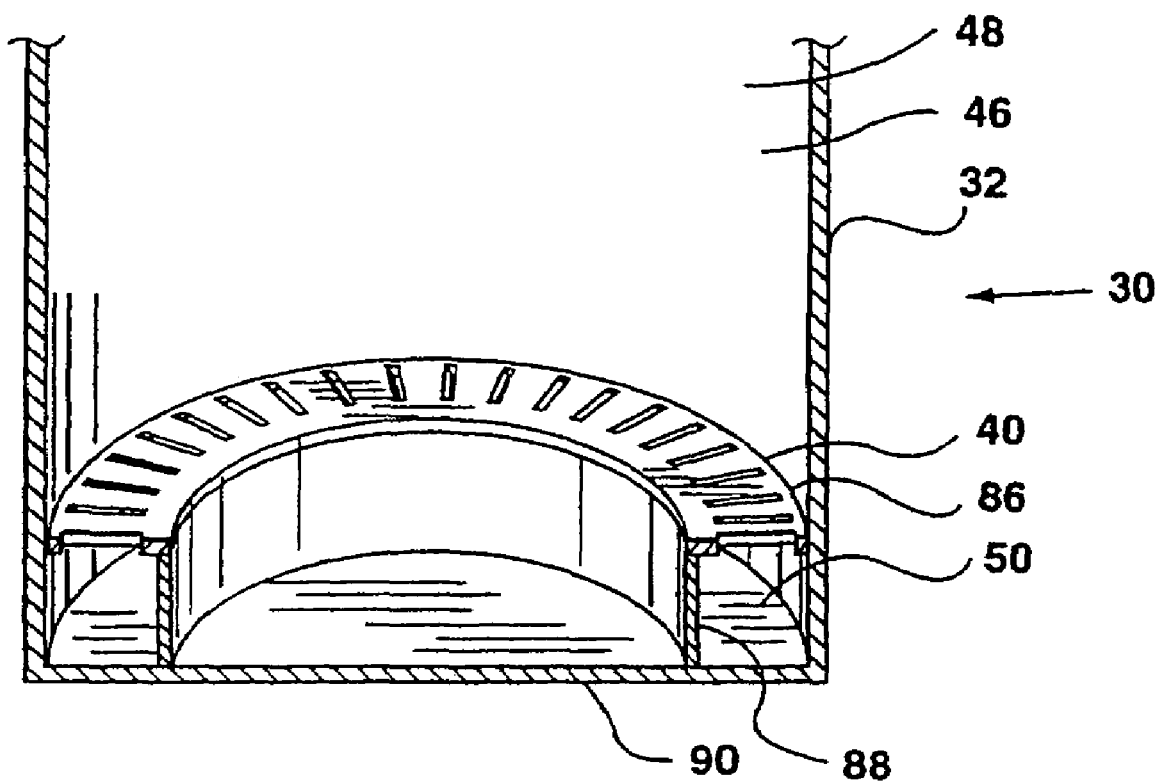
FIG. 16 is a sectional side view of an alternate embodiment of the particle separator member of the present invention.

Referring now to FIG. 16, separation member 40 need not extend across the entirety of cyclonic flow region 48, but rather may be disposed in only the portion of cyclonic flow region 48 beneath which apertures 52 are to be provided. By way of example only, FIG. 16 shows a separation member 40 which comprises an annular ring 86 disposed beneath peripheral portion 70 of cyclonic flow region 48. Particle receiving chamber 50 is disposed thereunder, between bin 32 and an inner wall 88. It will be understood by one skilled in the art that separation member 40 may equally have any other configuration suitable for a given separator application without departing from the scope of the present invention. It will be appreciated, for example, that separator 40 may comprise an annular ring positioned beneath inner portion 72 of cyclonic flow region 48.

Figure 17:
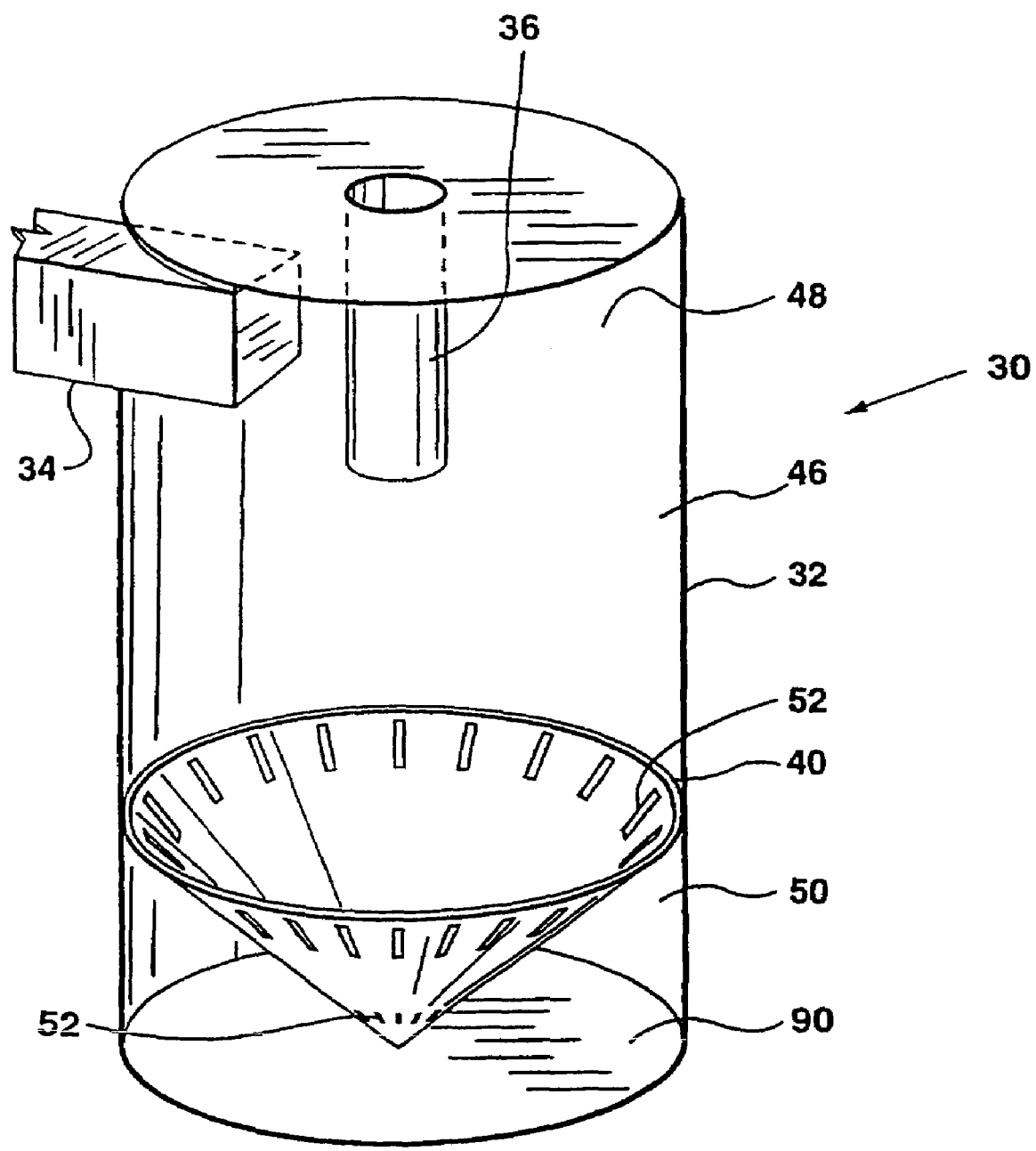
FIG. 17 is an isometric view of a further alternate embodiment of the particle separator member of the present invention.
Figure 18:
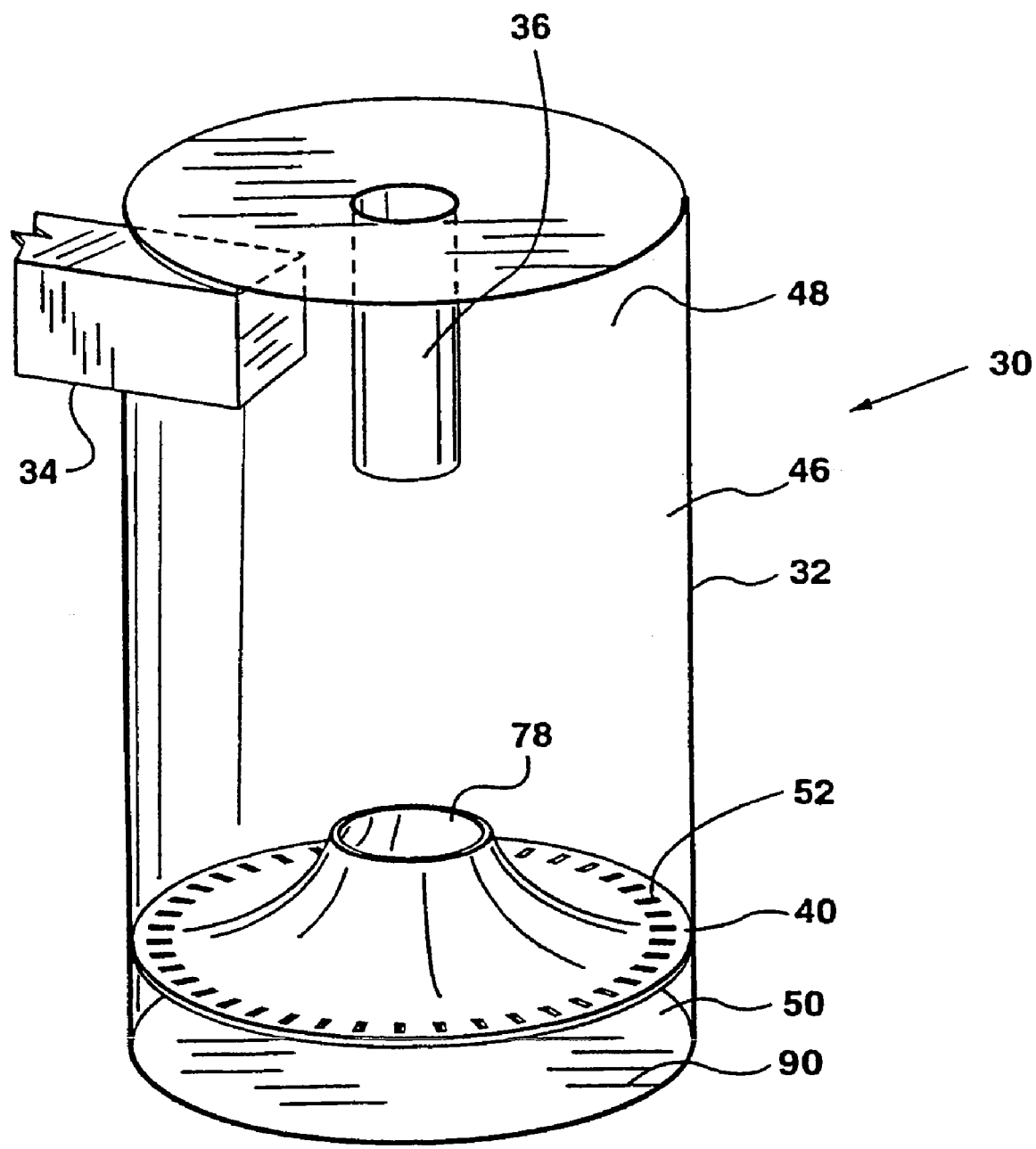
FIG. 18 is an isometric view of a further alternate embodiment of the particle separator member of the present invention.

Referring to FIGS. 17 and 18, respectively, separation member 40 need not be disc-shaped, but may also be conical or trumpet-shaped. It may be convex (i.e. it may project into particle receiving chamber 50 as shown in FIG. 17) or it may be concave (i.e. it may project away from particle receiving chamber 50 as shown in FIG. 18). It will be appreciated that separation member 40 need not define a continuous surface. For example, as shown in FIG. 18, it may have a curved surface in which apertures 52 are provided and a flat central top portion 78.

Figure 10:
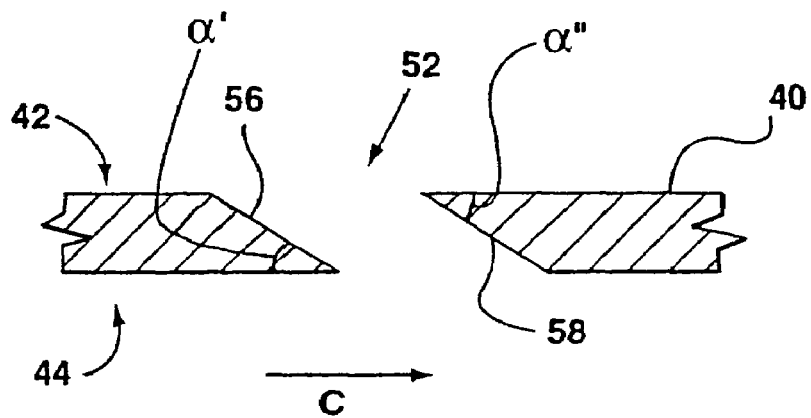
FIG. 10 is an enlarged cross-section view of the particle separator member of the present invention, showing aperture detail.

Referring to FIG. 10, edges 56 and 58 may be aerodynamically shaped to enhance the performance of separation member 40. For example, the thickness of particle separation member 40 is preferably reduced adjacent the upstream edge 56. Referring to FIG. 10, aperture 52 has a sloped upstream edge 56 to assist in directing air and particles from cyclone chamber 46 to particle receiving chamber 50. Upstream edge 56 is preferably sloped with respect to upper surface 42 such that the included angle a' is from 15 to 90° and an included angle less than 30° is more preferred. The thickness of downstream edge 58 of particle separation member 40 may be substantially unchanged. Alternately, aperture 52 is preferably shaped such that downstream edge 58 is sloped with respect to upper surface 42 to assist in directing air and particles from cyclone chamber 46 to particle receiving chamber 50. Preferably, the included angle a" is from 15 to 90° and an included angle less than 30° is more preferred.

Preferably, baffles 100 are provided on lower surface 44 and extend away from particle separation member 40. If separator 30 has a bottom 90, then preferably, baffles 100 extend from lower surface 44 towards bottom 90 but do not touch bottom 90. Baffles 100 preferably extend approximately three-quarters of the distance from lower surface 44 of separation member 40 to the bottom 90 of particle receiving chamber 50, but may be longer or shorter if desired. Preferably baffles 100 are parallel to the longitudinal axis of cyclone bin 32.

Figure 19:
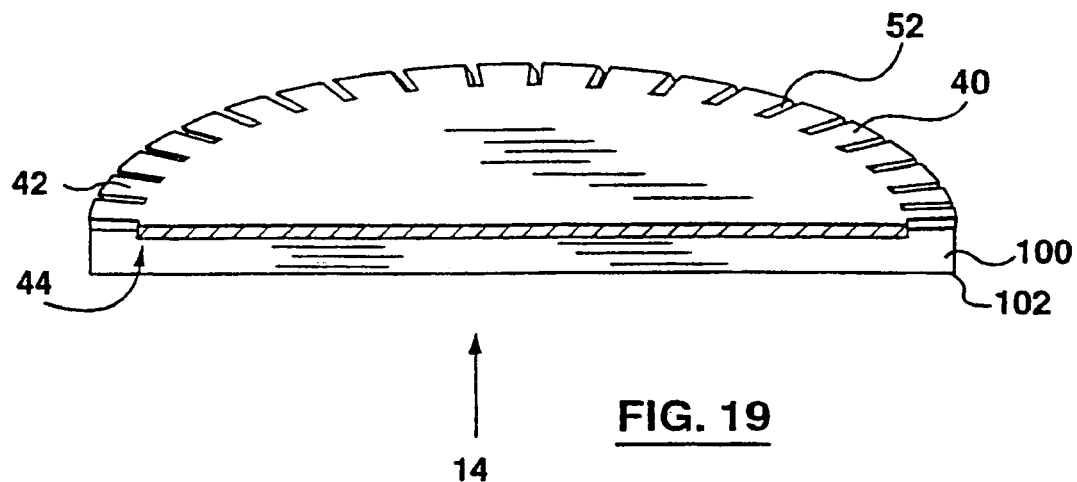
FIG. 19 is a sectional perspective view of and alternate embodiment of the baffle members according to the present invention.
Figure 20:
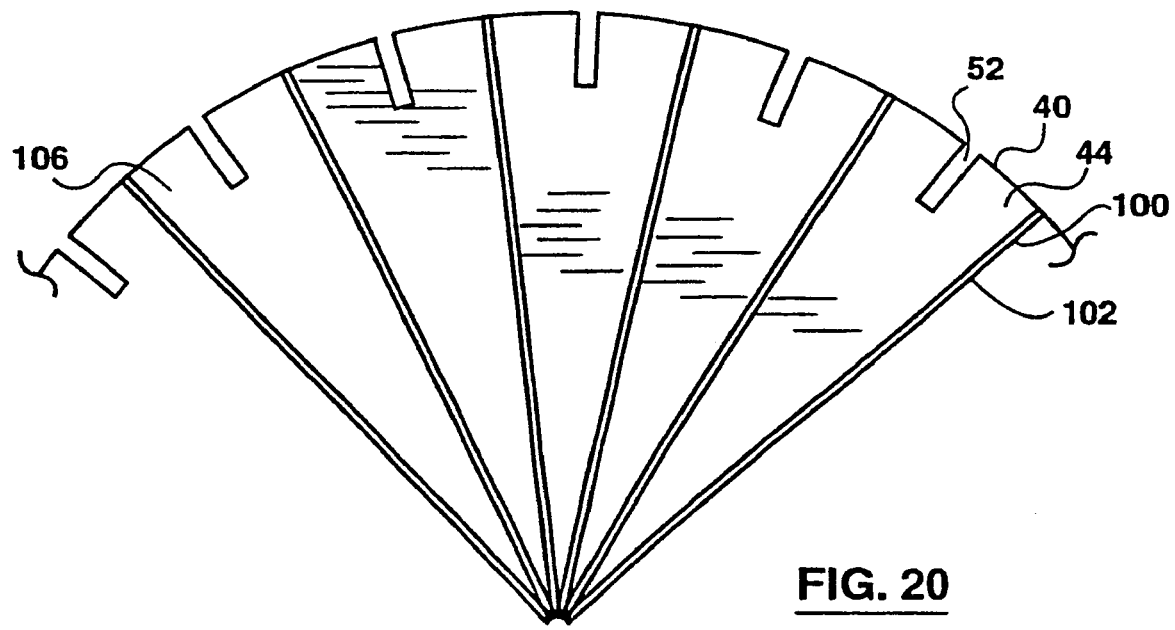
FIG. 20 is a bottom plan view of the baffle members of FIG. 19.

As shown in FIGS. 19 and 20, a baffle 100 is preferably disposed adjacent each aperture 52 on the downstream side, relative to cyclonic flow in cyclonic chamber 46 (arrow C). For example, a baffle 100 may be offset 15° downstream from its associated aperture 52. It will be appreciated that a baffle 100 need not be associated with each aperture 52. Preferably the baffles are immediately downstream of each aperture 52.

Baffles 100 comprises a wall 102 which may extend radially inwardly or which may be curved. Preferably wall 102 is substantially parallel to aperture 52 along its length. Wall 102 extends at least coterminously with the length of edges 56, 58 apertures 52. Preferably, wall extends at least three times the length of edges 56, 58.

Figure 12:
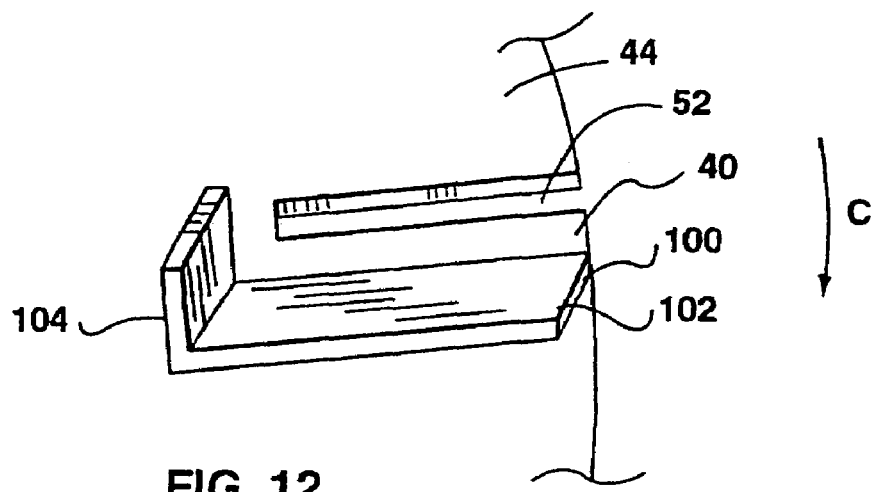
FIG. 12 is an enlarged bottom plan view in the direction of arrow 12 of the baffles of FIG. 11.

As shown in FIGS. 11 and 12, baffle 100 may also have a lateral wall 104 disposed adjacent outer and/or inner edges 82 and 84 of aperture 52. Wall 104 preferably extends from wall 102 in the upstream direction. If an aperture 52 is disposed in peripheral portion 70, baffle 100 preferable has one lateral wall 104 only, disposed adjacent inner edge 84. Wall 102 is positioned inward of edge 84 so as to define a dead air space beneath aperture 52. If an aperture 52 is located in inner portion 72, baffle 100 preferably has a lateral wall 104 disposed adjacent inner edge 84 and outer edge 82 of aperture 52 (not shown). Walls 104 may thus effectively define an open central area in particle receiving chamber 50.

Baffles 100, configured as a wall 102 alone or in conjunction with a lateral wall 104, reduce and preferably stop the cyclonic nature of the fluid flowing beneath separation member 40. Referring to FIGS. 19 and 20, baffles 100 may extend from the wall of bin 32 to its centre to effectively divide particle receiving chamber 50 into a plurality of pie-shaped compartments 106 within particle receiving chamber 50. This configuration substantially inhibits any fluid flow, cyclonic or otherwise, within compartments 106, thereby beneficially enhancing the anti-reentrainment of characteristics of separation member 40.

Preferably, as shown in the embodiment of FIGS. 2, 4, 5 and 7, a single baffle 100 is provided beneath particle separation member 40. As shown in these embodiments, baffle 100 extends vertically between bottom 90 and lower face 44 and radially outwardly from central air feed conduit 210 to inner wall 38. In this embodiment, baffle 100 is preferably positioned about 10 to 20° downstream from the point T where the cyclonic flow changes direction to flow upwardly through cyclonic flow region 48 (see FIGS. 5 and 6).

Although as described above, it is desirable to position apertures 52 in peripheral portion 70 and/or inner portion 72 of cyclonic flow region 48, when baffles 100 are used in conjunction with apertures 52 the positioning of apertures 52 is less critical. In such a case, apertures 52 with baffles 100 may be positioned at any location along the radial width of particle separation member 40 and may be disposed in any one or more of inner portion 72, medial portion 74 and peripheral portion 70 of cyclonic flow region 48.

After operation of vacuum cleaner 200, particles of varying size may have collected in bin 32 both above and below separation member 40. To empty such collected contents, bin 32 is preferably removable from main casing 206, via, eg., handle 212, and inverted (typically over a refuse collector of the like) to cause the collected particles on upper face 42 to fall from bin 32 under the influence of gravity.

If cyclone separator has a closed bottom 90, then a door or the like is preferably provided to assist in emptying chamber 50. The door may be provided on the outer wall of bin 32. Preferably, particle separation member 40 is constructed to assist in emptying the contents of particle receiving chamber 50 when bin 32 is inverted. To this end, particle separation member 40 may be constructed to provide an opening when bin 32 is inverted (see for example FIGS. 21 and 22) or a door may be provided in bin 32 prior to inverting bin 32.

Figure 22:
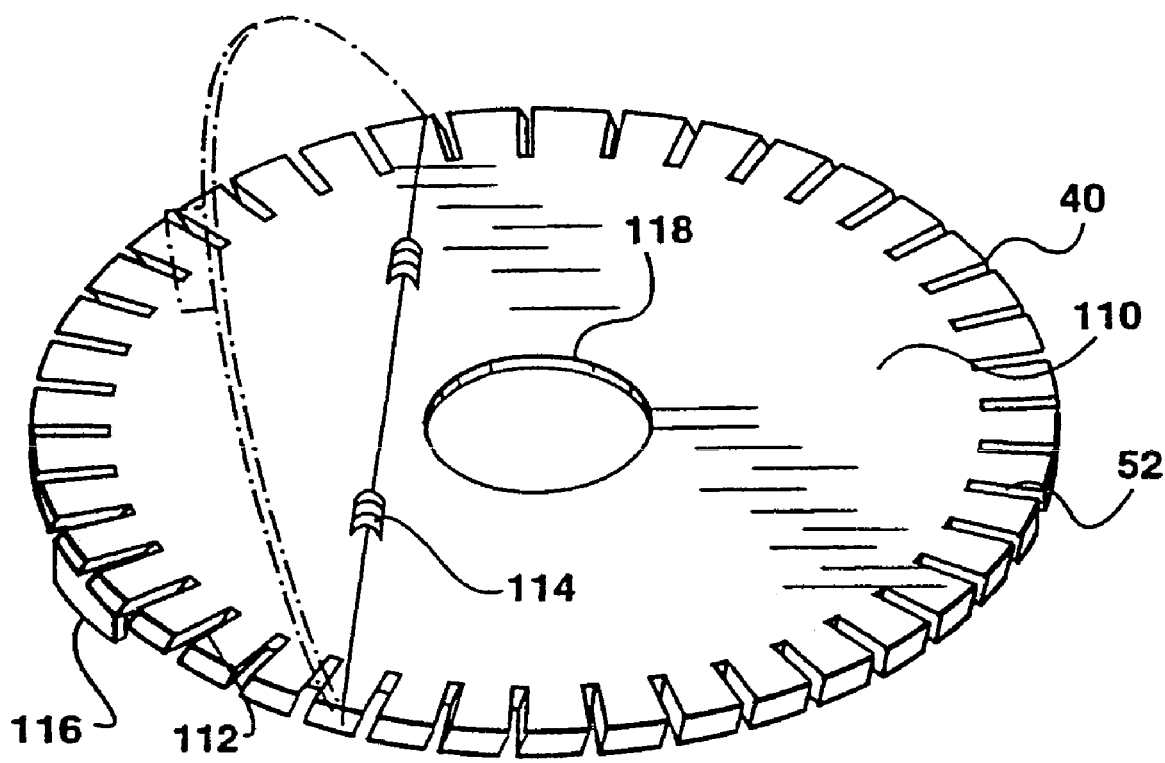

Pursuant to the first alternative, separation member 40 may comprise a main body 110 and an access member 112, as shown in FIG. 22. Access member 112 comprises a chord section of separation member 40 pivotally connected to main body 110 by a hinge member 114 to swing between a closed position, substantially planar with main body 110 (as represented by the solid lines in FIGS. 21 and 22) and an open position, wherein access member 112 swings upwardly relative to main body 110 (as represented by the broken lines in FIGS. 21 and 22).

Referring again to FIG. 21, when bin 32 is removed from vacuum cleaner 200 and inverted, access member 112, by virtue of its pivoting connection to main body 110, is permitted to freely swings to its "open" position under the influence of gravity, thereby permitting the contents of particle receiving chamber 50 to fall from particle receiving chamber 50 and out of bin 32. When bin 32 is returned to its upright position, the access member 112 falls to its closed position under the influence of gravity. To bias access member 112 towards its closed positioned when bin 32 is upright, access member 112 may optionally be provided with a weight 116, or a suitable spring means (not shown) or other biasing means known to those skilled in the art. Hole 118 is provided to permit centre air feed conduit 210 to pass there through.

The direction of the pivot axis 218 of hinge member 114 is preferably selected to assist access member 112 to remain closed while the vacuum cleaner is in use. If the vacuum cleaner is an upright vacuum cleaner in which particle separation member 40 is generally horizontally disposed position when main casing 206 is in the upright storage position (eg. separation member 40 is perpendicular to inner wall 38), then particle separation member 40 will be at an inclined position when main casing 206 is pivoted to the in use position. Access member 112 has a pivot axis 218 which is preferably not parallel to pivot axis 216 of the upper casing 206 of the vacuum cleaner. In such a case, no weight may be required. Preferably, pivot axis 218 of access member 112 is at an angle b of 10-50°, preferably 20° to 40°, and more preferably about 30° to the pivot axis 216 of upper casing 206 (see FIG. 21).

Access member 112 is preferably provided in the rear portion of the cyclone bin 32 to prevent access member 112 from opening during use. In particular, all or a major portion of access member 122 is preferably positioned rearward of centre air feed 210 (i.e. towards handle 208). In such a case, no weight may be required.

As the fluid flow travels through bin 32, a boundary layer forms. A boundary layer is formed on top of particle separation member 40 as the fluid travels over upper surface 42 of particle separation member 40. The boundary layer will thicken until a thickness is reached at which the boundary layer has sufficient energy to break off and travel away from upper surface 42 (i.e. point T). When this occurs, vortices are formed in the fluid stream adjacent apertures 52 causing localized turbulence. The turbulent flow reentrains particles that had been separated from the fluid flow and may even pull some of the separated particles out of particle receiving chamber 50. According to the instant invention, separator 30 is preferably constructed to minimize the thickness of the boundary layer when it breaks off thereby reducing turbulent flow in the vicinity of apertures 52. The introduction of the separation member according to the present invention to a cyclonic separator dramatically increases the overall efficiency of the separator. The prior art teaches the need for a plurality of cyclones in order achieve ultra-high particle separation efficiencies. However, it has been found that ultra-high efficiencies can be obtained in a single stage cyclone incorporating the particle separation member of the present invention. Accordingly, cleaning efficiencies in excess of 99% may be obtained with a single stage separator utilizing the separator 30 according to the present invention, thereby negating the need for second stage cyclonic separation altogether. Cleaning efficiencies of over 99.5% have also been achieved for particle laden air streams.

Therefore, the present invention permits ultra-high efficiencies to be attained with relatively simple separator configurations compared to the prior art. The reduction of separator structure, in turn, beneficially reduces the fluid pressure losses across the separator, thereby permits a deeper vacuum (increased fluid flow rate) to be drawn for a given motor size. For household vacuum cleaner applications, back pressures of only 4-8 kpa may be obtained allowing the motor size to be reduced without sacrificing the vacuum strength of the device. The reduced structure and motor size also beneficially result in a cost and size savings to the overall separator unit.

The baffle members according to the present invention greatly enhance the performance of the separation member and greatly assist in obtaining ultra-high efficiencies. The projection of baffle members into the particle receiving chamber beneficially disrupts and, depending on the baffle configuration, substantially inhibits cyclonic flow in the particle receiving chamber, thereby reducing the reentrainment of deposited particles.

In another preferred embodiment, the separation efficiency of particle separation member 40 may be increased by pulsing the electrical signal to motor 224. The timing of the pulses is determined to reduce and preferably minimize the maximum thickness of the boundary layer of fluid as it travels over upper surface 42 in the vicinity of point T. This produces a pulsed fluid flow through bin 32. Alternately, such a pulsed flow may be mechanically produced such as by providing inlet 34 with an moveable closure member such as plate 120 to which a means is attached to cause the plate to cyclically open and close inlet 34, eg. a spring, a solenoid 122 having an arm 124 attached to plate 120, or the like. Alternately, the aperture closure member may be provided on outlet 36. These mechanical devices effect the back pressure in bin 32 so as to favour smooth (laminar) boundary layer flow as opposed to turbulent flow in the vicinity of apertures 52.

The separation member access means according to the present invention provides a simple and convenient method of emptying collected particles from two chambers simultaneously, namely larger particles deposited in the cyclone chamber (i.e. on top of the particle separation member) and finer particles deposited in the particle receiving chamber. This provides a simple and convenient automatic method of emptying dual chambers.

The superimposed particle separation member according to the present invention also provides a convenient method for emptying collected particles from two chambers simultaneously. To enhance the convenience, the movement of the superimposed members may be linked to open when the bin is removed from the main casing.

While the above description constitutes the preferred embodiments, it will be appreciated that the present invention is susceptible to modification and change without departing from the fair meaning of the proper scope of the accompanying claims.

We claim:

1. A vacuum cleaner comprising:
   (a) a cleaner head adapted for movement over a surface and having a dirty air inlet;
   (b) a handle for moving the cleaner head over the surface;
   (c) a cyclone chamber having a cyclonic flow region, a fluid inlet downstream from the dirty air inlet and a fluid outlet;
   (d) a particle receiving chamber having a door and an outer wall;
   (e) a plate positioned between the cyclone chamber and the particle receiving chamber; and,
   (f) a motor for causing the air to flow through the vacuum cleaner from the dirty air inlet to a vacuum cleaner air outlet.

2. The vacuum cleaner of claim 1 wherein the door is provided in the outer wall.

3. The vacuum cleaner of claim 1 wherein the particle receiving chamber is disposed beneath the plate.

4. The vacuum cleaner of claim 1 wherein the particle receiving chamber is removably mounted to the vacuum cleaner.

5. The vacuum cleaner of claim 4 wherein the door is provided in the outer wall.

6. The vacuum cleaner of claim 4 wherein the particle receiving chamber is disposed beneath the plate.

7. The vacuum cleaner of claim 1 wherein the plate has a surface facing the cyclone chamber that is flat.

8. The vacuum cleaner of claim 1 wherein the vacuum cleaner is an upright vacuum cleaner having a main casing and the plate is horizontally disposed when the main casing is in an upright storage position.

9. The vacuum cleaner of claim 1 wherein the plate comprises a plurality of apertures.

* * * * *